United States Patent [19]
Barginear

[11] Patent Number: 5,209,423
[45] Date of Patent: May 11, 1993

[54] FISHING LINE SPOOL HOLDER
[76] Inventor: Larry Barginear, 922 Emerald St., Muskegon, Mich. 49442
[21] Appl. No.: 835,418
[22] Filed: Feb. 14, 1992
[51] Int. Cl.⁵ .......................................... B65H 59/04
[52] U.S. Cl. .............................. 242/129.8; 242/106; 242/156
[58] Field of Search .................. 43/25, 4, 44.98; 242/129.8, 106, 99, 156

[56] References Cited
U.S. PATENT DOCUMENTS

| | | | |
|---|---|---|---|
| 3,520,491 | 7/1970 | Hollack | 242/129.8 |
| 3,922,808 | 12/1975 | Reith et al. | 43/4 |
| 4,795,107 | 1/1989 | Williams | 242/106 |
| 4,948,059 | 8/1990 | Lewitt | 242/129.8 X |
| 4,948,064 | 8/1990 | Richard | 242/129.8 |

Primary Examiner—Richard K. Seidel
Assistant Examiner—Jeanne M. Elpel
Attorney, Agent, or Firm—Roger A. Marrs

[57] ABSTRACT

A holder is disclosed herein for rotatably supporting a spool whereby a supply of fishing line is carried on the spool with a lead length of line extending from the spool to a fishing pole mounted fishing reel. The holder includes a substantially U-shaped bracket with a cross member integrally supporting a pair of spaced-apart upright plates for carrying a spool support shaft about which the spool rotates during a line dispensing procedure. The shaft includes a friction adjustment mechanism for adjusting tension on the spool to control speed spool rotation. Mounting devices are disposed on the cross member for releasably securing the bracket to a stabilizing support for such a table.

1 Claim, 1 Drawing Sheet

FISHING LINE SPOOL HOLDER

BACKGROUND OF THE INVENTION

1. Field of the Invention

The present invention relates to the field of fishing line spool holders, and more particularly to a novel holder for rotatably mounting a supply of fishing line on a spool having an adjustment for controlling spool rotation and which may be readily mounted onto a supporting surface.

2. Brief Description of the Prior Art

In the past, it has been the conventional practice to manually place a supply of fishing line onto a fishing reel by having one person hold a spool containing a store of fishing line while the other person holds a fishing pole with a mounted fishing reel. By using the turning crank on the fishing reel, line from the spool supply can be drawn from the spool and transferred to the fishing reel for subsequent use during a fishing procedure. Such a practice is time consuming and requires the presence of more than one individual. Also, since the supply spool is hand-held, it is often dropped and removing the supply of line from the spool is very cumbersome and awkward.

Therefore, a long-standing need has existed to provide a novel means for supporting a supply of line on a spool so that the line may be readily withdrawn from the spool and placed directly onto a fishing reel by a single individual. The means should support the spool having the supply of line thereon in such a manner that the spool is stabilized and will not drop or roll out of control during the line withdrawing procedure.

SUMMARY OF THE INVENTION

Accordingly, the above problems and difficulties are obviated by the present invention which provides a novel fishing line holding device which includes a yoke-like bracket having a cross member supporting a pair of upright plates on the opposite ends of the cross member respectively. A support shaft is carried between the opposing surfaces of the plates on which a spool of fishing line is rotatably carried. The space or area between the opposing surfaces of the plates is occupied by the spool and the plates are made slightly movable with respect to each other so that an adjustment means may be employed to exert frictional pressure against the side of the spool for tension control purposes. In one form of the invention, such means includes a wing nut attached to the end of an elongated bolt serving as the turning shaft for the spool. The holder further includes means for detachably supporting the bracket onto a stabilizing surface such as that of a table or the like. A frontal plate carried on the cross member between the pair of plates ahead of the spool serves as a guide for the stored fishing line as it is withdrawn from the spool.

Therefore, it is among the primary objects of the present invention to provide a novel means for placing an extended length of fishing line onto a fishing reel from a supply spool which is detachably mounted on a supporting surface.

Another object of the present invention is to provide a novel holder for a spool having a supply of fishing line thereon whereby the line may be transferred to a fishing reel by a single individual.

Still another object of the present invention is to provide a novel inexpensive holder for a spool having a supply of fishing line thereon whereby the dispensing or withdrawal of the line from the spool is readily controlled by a frictional or tension adjustment.

A further object resides in the provision of a convenient means for transferring a length of fishing line from one spool to a fishing reel without the necessity of two persons, and which may be achieved in a speedy and inefficient manner.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
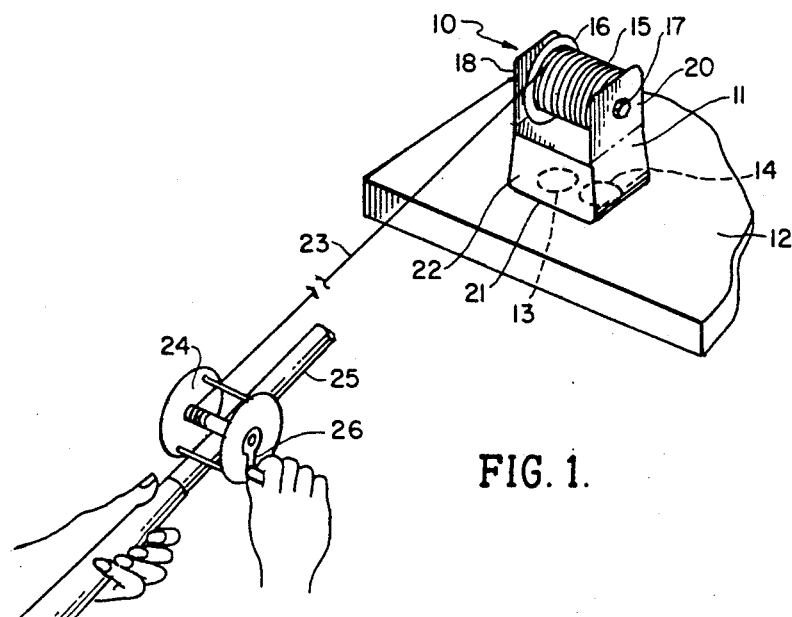
FIG. 1 is a front perspective view of the novel fishing line spool holder incorporating the present invention.

Referring to FIG. 1, the novel fishing line spool holder of the present invention is illustrated in the general direction of arrow 10, which includes a yoke-like or U-shaped bracket 11 releasably mounted on a supporting surface such as a table 12 by means of suction cups 13 and 14 respectively. A supply of fishing line is broadly indicated by numeral 15 and the line is coiled about the midsection of a spool 16 rotatably carried on the bracket by means of an elongated shaft 17. The shaft 17 is carried between a pair of bracket plates 18 and 20 respectively that are integrally formed at opposite ends of a cross member, indicated by numeral 21. A frontal plate 22 serves as a guide for the fishing line 15 as it is being dispensed or withdrawn from the spool 16.

In actual use, the line is withdrawn by extending a lead length of line, indicated by numeral 23, having its free end fastened to the midsection of a fishing reel 24. It is to be understood that the fishing reel does not form a part of the present invention and is described herein only for illustrative purposes with respect to usage and function of the holder 10. The reel 24 is mounted on a fishing pole 25 and includes a hand crank 26 rotated by one hand of the user to withdraw fishing line from spool 16 onto the reel 24 while the pole 25 is supported by the other hand of the user. In this manner, one person or individual may readily wind fishing line onto the fishing reel 24 by himself.

Figure 2:
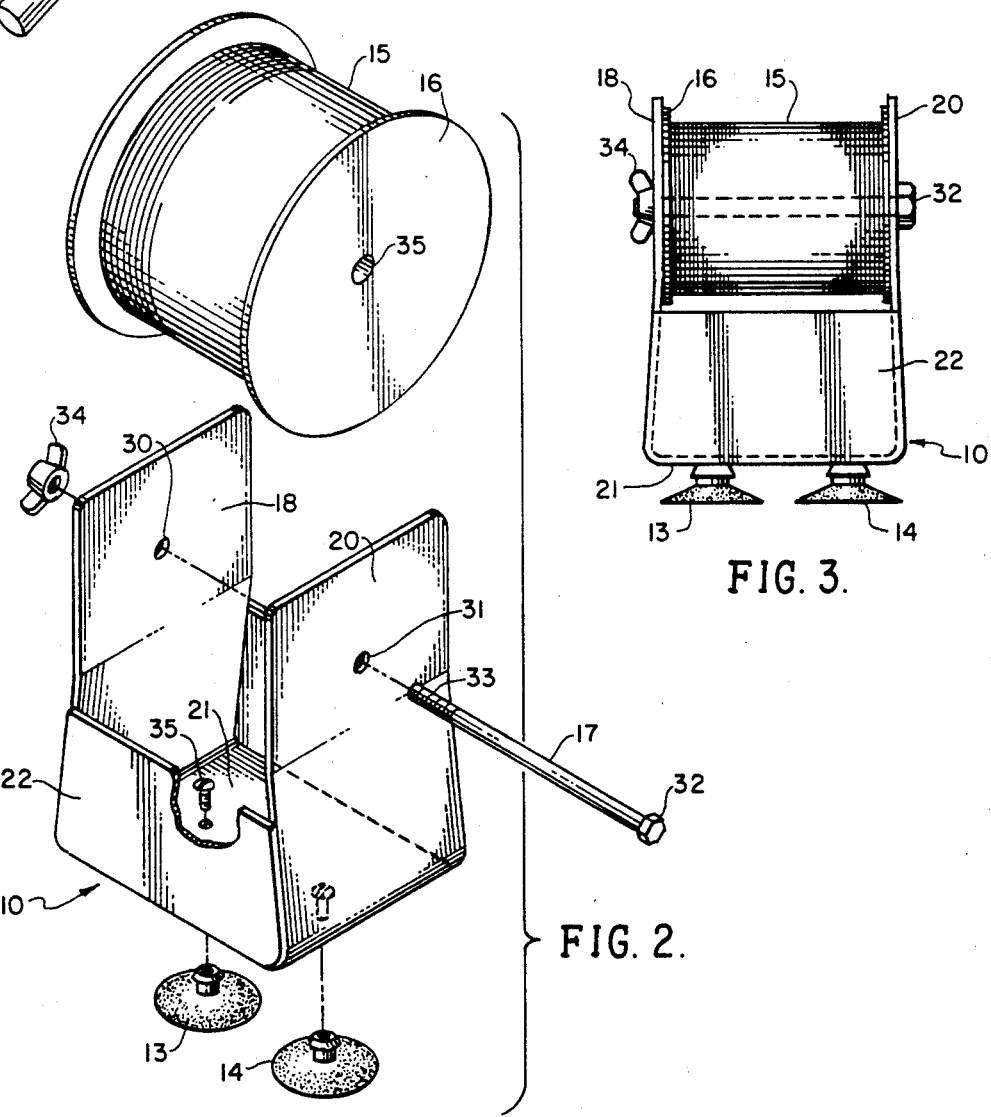
FIG. 2 is an enlarged exploded perspective view showing the components of the fishing line spool holder shown in FIG. 1.

Referring now in detail to FIG. 2, it can be seen that the plates 18 and 20 include aligned apertures or holes 30 and 31 through which the spool mounting shaft 17 is insertably received. The shaft is maintained on the respective plates by means of an enlarged head 32 carried on one end of the shaft while its opposite end includes threads 33 that are engaged by a wingnut 34. Therefore, since the head 32 and wingnut 34 are on the outside of the plates 18 and 20, the shaft will be mounted on the plates and the shaft passes through a central bore or opening 35 to support the spool 16 thereon. The suction cups 13 and 14 are attached to the cross member 21 by means of screws, such as screw 35 in connection with suction cup 13. The guide plate 22 is not only supported on the front edge of cross member 35 but is connected to a portion of the plates 18 and 20 across their frontal edges.

Figure 3:
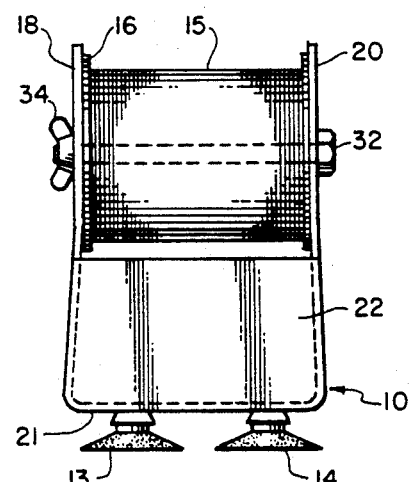
FIG. 3 is a reduced front elevational view of the fishing line spool holder fully assembled from the components shown in FIG. 2.

Referring now in detail to FIG. 3, a fully assembled spool on the bracket is illustrated and it can be seen that frictional tension can be placed on the spool to control the speed of rotation by tightening or loosening of the wingnut 34. If it is desired to pull a length of fishing line from the spool 16 in a rapid manner, the wingnut is loosened on the shaft 17 so that the distance between the opposing surface of the plates 18 and 20 will slightly expand to release the spool during rotation. However, when it is desired to place a tension on the line as it is being withdrawn from spool 16, the wingnut may be tightened so that the opposing surfaces of the plates will frictionally bear against the opposite sides of the spool.

Therefore, it can be seen that the spool holder of the present invention provides a novel means for dispensing a stored line of fishing line onto a remote fishing reel. Tension is suitably controlled by manual adjustment of the wingnut 34.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A spool device for dispensing a quantity of fishing line comprising:
   a yoke-like bracket having bendable upright end plates with separated and opposing bearing surfaces adapted to be moved towards and away from each other;
   a spool rotatably carried on said bracket between said plate bearing surfaces;
   a supply of fishing line disposed on said spool adapted to be withdrawn from said spool as said spool rotates;
   adjustable means operably coupling said spool and said bracket for applying frictional tension on said spool via said plate bearing surfaces when moved towards each other;
   mounting means detachably connecting said bracket to a supporting member;
   said yoke-like bracket is a U-shaped member having an integral cross member joined at its opposite ends by said spaced-apart bendable end plates;
   a shaft disposed between said end plates;
   said spool rotatably carried on said shaft between said end plates and having end flanges slidably bearing against said opposing end plate bearing surfaces;
   said adjustable means includes a movable wing nut mounted exteriorly of a selected one of said end plates on said shaft and adapted to adjustably bear against said selected end plate to control the rate of fishing line withdrawal and tension;
   said mounting means includes a pair of suction cups attached to said cross member along its central longitudinal axis;
   a guide plate fixedly carried on said cross member and said end plates ahead of said spool;
   said end plates opposing bearing surfaces engageable with opposite end flanges of said spool and responsive to said adjustable means to frictionally bear against said spool to control said rate of fishing line withdrawal and tension.

* * * * *